Oct. 24, 1933.                D. H. THOMPSON                1,931,776
                        AUTOMATIC TRAIN PIPE COUPLING
                    Filed Nov. 10, 1930        3 Sheets-Sheet 3
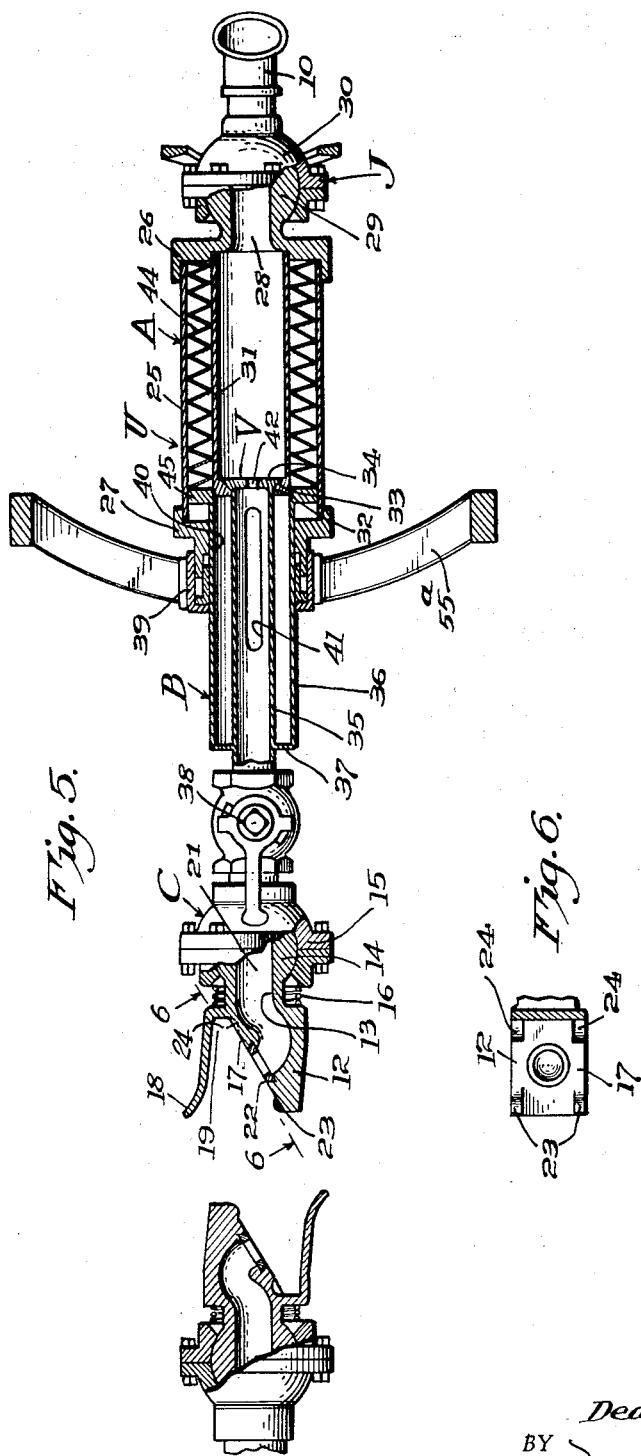
INVENTOR.
Dean H. Thompson,
BY
ATTORNEYS.

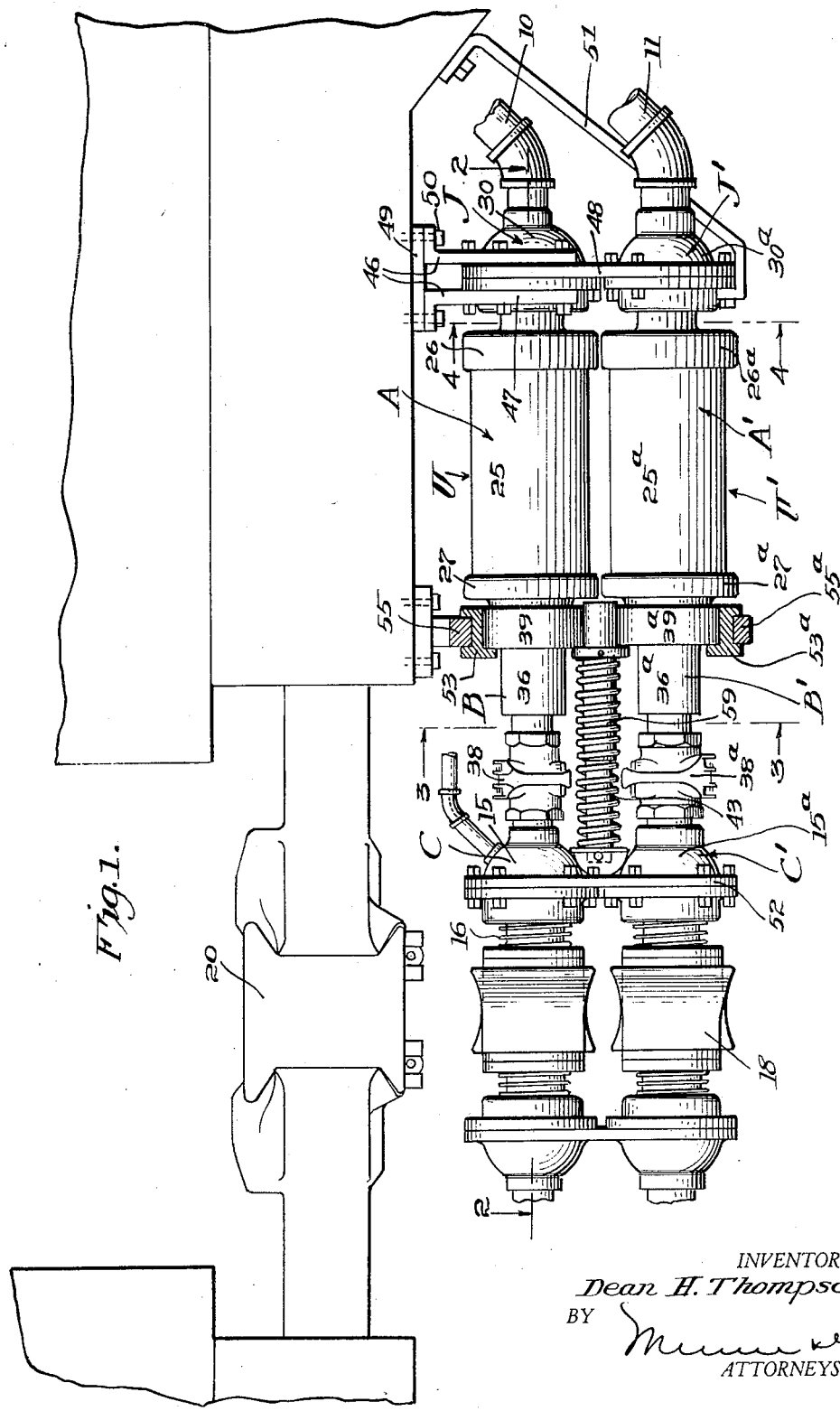

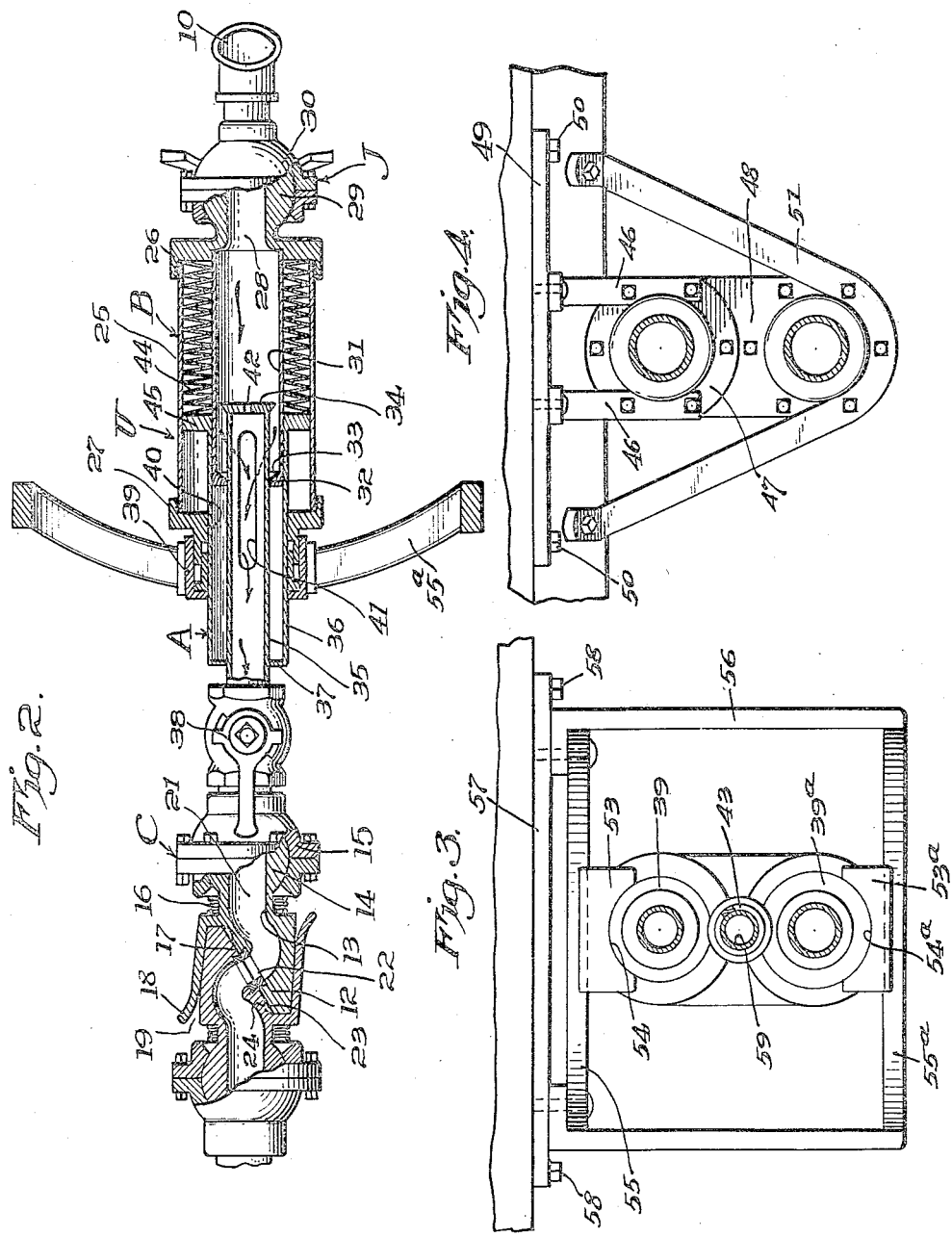

Patented Oct. 24, 1933

1,931,776

UNITED STATES PATENT OFFICE 1,931,776

AUTOMATIC TRAIN PIPE COUPLING

Dean H. Thompson, Los Angeles, Calif.

Application November 10, 1930
Serial No. 494,725

13 Claims. (Cl. 284—6)

My invention relates to and has for a purpose the provision of a coupling of simple, rugged and compact construction, by which the train pipes of cars can be connected automatically in response to coupling of the cars so as to eliminate the manual connection of the pipes by the trainmen with the attendant danger of injury, all while avoiding the unsatisfactory use of flexible hose between the train pipes and coupling, and insuring that a fluid tight connection will be maintained by the coupling during service, irrespective of relative positions of the cars either vertically or horizontally, or varying conditions resulting from the subjection of the car coupler to draft or compression.

It is another purpose of my invention to provide a train pipe coupling of the above described character embodying means operable automatically should the car coupler part and the train break in two, to close the steam pipe and prevent loss of steam, as well as avoid an emergency application of the brakes resulting from a full opening of the brake pipe to atmosphere, and instead insuring a relatively slow application of the brakes to prevent damage to the train.

It is a further purpose of my invention to provide a train pipe coupling adapted for use on both passenger and freight trains, and in a manner to connect both air and steam lines while preventing excessive condensation in the air line from heat of the steam line, as well as enabling the steam line to be utilized as a secondary air line for freight service, to supply air to that part of a long train beyond which pressure in the main air line falls below service pressure.

I will describe only one form of automatic train pipe coupling embodying my invention, and will then point out the novel features thereof in claims.

In the accompanying drawings:

Figure 1 is a view showing in side elevation partly broken away, one form of train pipe coupling embodying my invention, and occupying its pipe connecting position.

Figure 2 is a horizontal sectional view taken on the line 2—2 of Figure 1 and looking in the direction of the arrows.

Figures 3 and 4 are transverse sectional views taken respectively on the lines 3—3 and 4—4 of Figure 1 and looking in the direction of the respective arrows.

Figure 5 is a view similar to figure 2 and illustrating the disconnected position of the coupling when cars are uncoupled, and Figure 6 is a detail sectional view taken on the line 6—6 of Figure 5 and looking in the direction of the arrows.

Referring specifically to the drawings in which similar reference characters designate similar parts in each of the several views, my invention in its present embodiment comprises two coupling elements C and C' and two fluid conducting units U and U' for conducting fluid from the usual brake and steam pipes 10 and 11 of a car to the respective coupling elements. As the two coupling elements and the two units are each identical in construction, a description of one coupling element and its fluid conducting unit will suffice for both, but to distinguish the parts of one element and unit from those of the others, the numerals designating the parts of one element and unit are provided with exponents.

The coupling element C comprises a head 12 provided with a shank 13 terminating in a ball 14 co-acting with a socket 15 receiving the ball, to provide a universal joint or connection. A coil spring 16 surrounds the shank 13 and engages the socket and head to yieldingly maintain the latter in a central position for proper engagement with a complementary head of an identical coupling element on another car.

The head 12 is provided with a coupling face 17 inclined with respect to the longitudinal axis of the coupling element as shown in Figure 1, and co-acting with a flaring tongue 18 on the head, to define a wedge shaped pocket 19 into which a complementary head of another coupling element is received as shown in Figure 2 to connect the heads together when cars are coupled by the conventional car coupler 20.

The coupling element C is provided with a duct 21 extending therethrough from the socket 15 to the coupling face 17 and surrounded by a flexible gasket 22 seating in a recess in the coupling face as shown in Figure 2. The forward end or nose of the head 12 is provided with protuberances 23 projecting from the coupling face 17 and spaced apart a greater distance than the diameter of the gasket 22. The coupling face 17 is also provided at its rear end with depressions 24 complementary to the protuberances 23. When two coupling elements C having complementary heads provided with the protuberances and depressions as above described, are initially engaged with each other during a car coupling operation, the protuberances of each head will ride over the coupling face of the other head to space apart the coupling faces of the two heads until the latter are fully engaged as shown in Figure 2 so as to prevent wiping of one head across the gasket 22 of the other head with possible injury to or displacement of the gasket. When the heads are fully engaged the protuberances of each head seat in the depressions of the other head and thus permit the coupling faces and gaskets to tightly engage and form a fluid tight joint between the heads as will be understood.

The fluid conducting unit U broadly comprises two telescopically associated fluid conducting sections A and B, the section A being connected to the brake pipe 10 and the section B to the coupling element C for co-action in conducting fluid from the brake pipe to the coupling element without leakage, irrespective of the constantly varying relative positions of two coupled cars during service.

The section A comprises a cylinder 25 closed at its ends by threadedly secured caps 26 and 27, the former of which is provided with an axially disposed inlet 28 in the form of a passage extending through a ball member 29 projecting from and integral with the cap. The ball member 29 constitutes one part of a universal joint J, the other part of which is in the form of a hollow socket member 30 receiving the ball member and connected to the brake pipe 10 so that fluid from the latter will be conducted through the universal joint J to the inlet 28.

The section A also includes a pipe 31 threaded at one end into the cap 26 so as to be axially disposed in the cylinder and extend longitudinally thereof in communication with the inlet 28. The opposite end of the pipe 31 is partially closed and provided with an axially disposed opening 32 surrounded by an annular valve seat 33 with which a valve element 34 provided on the section B is adapted to co-act to form a valve V for controlling the flow of fluid from the pipe 31 in a manner to be later described.

The section B comprises two pipes 35 and 36, the former axially disposed in the latter and extending from the closed end 37 thereof for rigid connection to the socket 15 of the coupling element C through the medium of a conventional angle cock 38. The pipe 36 of the section B is slidable freely through a stuffing box 39 on the cap, and through an opening 40 in the latter so that the pipes 35 and 36 extend into the cylinder. The pipe 35 extends through the opening 32 of the pipe 31 into the latter so as to be telescopically associated therewith, whereas the pipe 36 receives the pipe 31 so as to also be telescopically associated therewith.

The inner end of the pipe 35 is closed by the valve element 34 above referred to, and this pipe is provided with a lateral port 41 in the form of a longitudinally extending slot through which fluid from the pipe 31 is free to flow into the pipe 35. The valve element 34 is provided with a vent port 42 through which a reduced amount of fluid from the brake pipe is permitted to discharge to atmosphere when the section B occupies the extreme or extended position shown in Figure 5, under the biasing action of a spring 43, so that although in this position of the section B, the port 41 clears the pipe 31, and the valve element 34 co-acts with the valve seat 33 to seal the opening 32 against the passage of fluid from the pipe 31, a sufficient quantity of air will escape through the vent port 42 to atmosphere to prevent an emergency application of the brakes should the train break in two as a result of the car coupling 20 parting and the coupling element C becoming disconnected from its co-acting coupling element. However, it is to be noted that in the unit U', the vent port 42 is preferably dispensed with so as to prevent the escape of steam from the train pipe 11, when the coupling element C' and its co-acting coupling element are disconnected.

A sealing element 44 illustrated as a flexible metallic bellows of annular form, surrounds the pipe 31 within the cylinder 25 and is secured at one end to a flange 45 on the inner end of the pipe 36, and at its opposite end is clamped between the cylinder and cap 26 so as to seal the pipes against the escape of fluid therefrom while permitting free and unobstructed telescoping movement of the section B relative to the section A.

The units U and U' are supported horizontally from the frame of the car in superposed relation directly beneath the car coupler 20 by means of L-shaped brackets 46 secured to a flange 47 on the socket member 30 and to a second flange 48 integral with and connecting the socket members 30 and 30ᵃ. The brackets 46 are secured to a plate 49 and the latter in turn is secured by bolts 50 to the car frame. A brace 51 is secured to the socket member 30ᵃ and to the car frame, and co-acts with the brackets to rigidly support the rear ends of the units U and U'.

The forward ends of the units U and U' are supported for swinging movement of the units horizontally about the axes of the universal joints J and J'. To this end a flange 52 formed integral with and rigidly connecting the sockets 15 and 15ᵃ of the coupling elements C and C', co-operates with the flange 48 to tie the units U and U' together in definite spaced relation one above the other. Upper and lower shoes 53 and 53ᵃ having arcuate recesses 54 and 54ᵃ respectively receiving portions of the stuffing boxes 39 and 39ᵃ, are slidably mounted on arcuate rails 55 and 55ᵃ forming part of a rectangular bracket 56 secured to a plate 57 which in turn is secured by bolts 58 to the car frame. The units U and U' are thus mounted to swing horizontally with the coupling elements C and C' in accordance with the varying angular relationships of coupled cars during service. It will be noted that the single spring 43 is interposed between the flange 52 and the stuffing boxes 39 and 39ᵃ, and is mounted on a telescopic rod 59 so as to normally urge the sections B and B' of the units U and U' to the extreme or extended position shown in Figure 5 wherein the coupling elements C and C' are disposed in advance of the coupler head of the car coupler 20.

The operation of the train pipe coupling is as follows:

Let it be assumed that two cars are equipped with my invention and are being brought together to be coupled. Prior to engagement of the car couplers 20, the coupling elements C and C' on one car will be engaged with the co-acting coupling elements on the other car and the sections B and B' of the units U and U' forced inwardly together from the extended position shown in Figure 5 to the retracted position shown in Figure 2, thus disengaging the valve element 34 from the respective seat 33 to permit the flow of air from the train pipes 10 and 11 of one car through the now coupled pairs of coupling elements C and C', to the corresponding train pipes of the other car.

Should the couplers 20 part, with the attendant disconnection of the coupling elements C and C' on one car from those on the other car, the sections B and B' of the units U and U' on each car will move to extended position under the urging action of the spring 43 to thus cause the valve elements 34 to again engage the respective seats and thereby seal the train pipe 11 against the escape of steam. As a reduced quantity of air is free to pass through the vent ports 42, a sufficient quantity of air can escape from the brake pipe 10 to prevent an emergency application of the brakes, and instead produce a service application.

In the use of my invention on freight trains not requiring a supply of steam, the train pipe 11 can be used as a secondary air pipe on long trains, for supplying air to the rear portion of the train to boost the pressure in the brake pipe sufficiently to maintain the necessary service pressure throughout the length of the train.

Although I have herein shown and described only one form of automatic train pipe coupling embodying my invention, it is to be understood that various changes and modifications may be made therein without departing from the spirit of the invention and the spirit and scope of the appended claims.

I claim:

1. In an automatic train pipe coupling, a fluid conducting unit comprising telescopically associated fluid conducting sections, one of which is provided with a coupling element, a fluid conducting universal joint, one part of which is connected to the second section and conducts fluid to the latter, and the other part of which is adapted for connection to a train pipe of a car to conduct fluid from the train pipe to the first part, means for adjustably supporting said unit from the car while permitting movement of the unit about the axis of the universal joint, and means for urging the first section to one extreme position relative to the second section.

2. In an automatic train pipe coupling, a fluid conducting unit comprising two sections, one including a cylinder having an inlet and a pipe extending longitudinally in the cylinder and communicating with the inlet, means for connecting the inlet to a train pipe to receive fluid therefrom, the second section having an outlet and including pipes one within the other and with the inner pipe in communication with the outlet, the pipes of the second section extending into the cylinder in telescopic association with the first pipe, a coupling element connected to the second section in communication with the inner pipe of the latter, the inner pipe having a port through which fluid from the first pipe is free to flow into the inner pipe, and means for urging the second section to an extreme position wherein the port is out of communication with the first pipe.

3. In an automatic train pipe coupling, a fluid conducting unit comprising two sections, one including a cylinder having an inlet and a pipe extending longitudinally in the cylinder and communicating with the inlet, means for connecting the inlet to a train pipe to receive fluid therefrom, the second section having an outlet and including pipes one within the other and with the inner pipe in communication with the outlet, the pipes of the second section extending into the cylinder in telescopic association with the first pipe, a coupling element connected to the second section in communication with the inner pipe of the latter, the inner pipe having a port through which fluid from the first pipe is free to flow into the inner pipe, means for urging the second section to an extreme position wherein the port is out of communication with the first pipe, and co-acting valve means on the first pipe and inner pipe for sealing the first pipe against the flow of fluid therefrom when the second section occupies said extreme position.

4. In an automatic train pipe coupling, a fluid conducting unit comprising two sections, one including a cylinder having an inlet and a pipe extending longitudinally in the cylinder and communicating with the inlet, means for connecting the inlet to a train pipe to receive fluid therefrom, the second section having an outlet and including pipes one within the other and with the inner pipe in communication with the outlet, the pipes of the second section extending into the cylinder in telescopic association with the first pipe, a coupling element connected to the second section in communication with the inner pipe of the latter, the inner pipe having a port through which fluid from the first pipe is free to flow into the inner pipe, means for urging the second section to an extreme position wherein the port is out of communication with the first pipe, and co-acting valve means on the first pipe and inner pipe for sealing the first pipe against the flow of fluid therefrom when the second section occupies said extreme position, the inner pipe having a vent port through which a reduced quantity of fluid can flow from the first pipe to the inner pipe when the second section occupies said extreme position.

5. In an automatic train pipe coupling, a fluid conducting unit comprising two sections, one including a cylinder having an inlet and a pipe extending longitudinally in the cylinder and communicating with the inlet, means for connecting the inlet to a train pipe to receive fluid therefrom, the second section having an outlet and including pipes one within the other and with the inner pipe in communication with the outlet, the pipes of the second section extending into the cylinder in telescopic association with the first pipe, a coupling element connected to the second section in communication with the inner pipe of the latter, the inner pipe having a port through which fluid from the first pipe is free to flow into the inner pipe, means for urging the second section to one extreme position, and a sealing element correlated with the cylinder and outer pipe of the second section, to seal the joint between the outer pipe and the first pipe against the escape of fluid from the pipes.

6. In an automatic train pipe coupling, a fluid conducting unit comprising two sections, one including a cylinder having an inlet and a pipe extending longitudially in the cylinder and communicating with the inlet, means for connecting the inlet to a train pipe to receive fluid therefrom, the second section having an outlet and including pipes one within the other and with the inner pipe in communication with the outlet, the pipes of the second section extending into the cylinder in telescopic association with the first pipe, a coupling element connected to the second section in communication with the inner pipe of the latter, the inner pipe having a port through which fluid from the first pipe is free to flow into the inner pipe, means for urging the second section to one extreme position, and an extensible sealing element in the cylinder, secured to the latter and to the outer pipe of the second section, to seal the joint between the outer pipe and the first pipe against the escape of fluid from the pipes.

7. In an automatic train pipe coupling, a fluid conducting unit comprising two sections one including a cylinder having an inlet and a pipe extending longitudinally in the cylinder and in communication with the inlet, the second section having an outlet and including a pipe communicating with the outlet and extending into the cylinder to telescopically receive the first pipe for the flow of fluid from the latter to the second pipe, and a sealing bellows surrounding the first pipe, and connected to the second pipe to seal the joint between the latter and first pipe against the escape of fluid from the pipes.

8. In an automatic train pipe coupling, a fluid conducting unit comprising telescopically associated fluid conducting sections, one of which is provided with a coupling element, means for connecting the other section to the train pipe of a car, means for urging the first section to one extreme position relative to the second section, the coupling element having a head provided with an inclined coupling face, and having a fluid conducting passage opening to said face, means on the coupling element coacting with said face to define a wedge shaped pocket into which the head of a complementary coupling element is adapted to be received for co-action with said face in producing a fluid tight joint, a gasket seated in the coupling face and surrounding said passage, and means for maintaining the coupling face spaced from the coupling face of a complementary coupling element until the coupling elements are engaged.

9. In an automatic train pipe coupling, a fluid conducting unit comprising telescopically associated fluid conducting sections, one of which is provided with a coupling element, means for connecting the other section to the train pipe of a car, means for urging the first section to one extreme position relative to the second section, the coupling element having a head provided with an inclined coupling face, and having a fluid conducting passage opening to said face, means on the coupling element coacting with said face to define a wedge shaped pocket into which the head of a complementary coupling element is adapted to be received for co-action with said face in producing a fluid tight joint, and protuberances on, and depressions in the coupling face co-acting with a complementary coupling face of another coupling element to maintain the coupling faces spaced apart until the coupling elements are engaged to prevent damage to the gaskets.

10. In an automatic train pipe coupling, two telescoping tubes having valve means for regulating communication from one tube to the other tube, a coupling element having an inclined face for contacting with an inclined face on a companion coupling element, there being a fluid passage extending from the said face rearwardly, and a fluid-conducting universal joint connecting the coupling element with one of the tubes and affording communication between the rear of the said fluid passage and the last mentioned tube.

11. In an automatic train pipe coupling, a coupling element having a head provided with an inclined face, there being a fluid passage extending from said face rearwardly, a tongue extending outwardly from the inner end of said inclined face, a conducting element, a fluid-conducting universal joint connecting the head at the rear of the fluid passage with the conducting element, resilient means for holding the head yieldingly relatively to the fluid-conducting universal joint, there being a depression in the inclined face for receiving a protuberance on a companion fluid-conducting unit, and a protuberance on the inclined face for disposal in a depression in the said companion fluid-conducting unit.

12. In an automatic train pipe coupling, telescoping tubes, valve means for regulating the flow of a fluid through the tubes, a fluid-conducting universal joint having two parts, one part being secured to one of the tubes, supporting means for the other part, guide means for directing the transverse movement of the telescoping tubes, a second fluid-conducting universal joint having two parts, one of which is connected with another tube, a coupling head connected with the other part of the second mentioned fluid-conducting universal joint, and resilient means for holding the coupling head yieldingly relatively to the second mentioned fluid-conducting universal joint.

13. In an automatic train pipe coupling, telecoping tubes, valve means for regulating the flow of a fluid through the tubes, a fluid-conducting universal joint having two parts, one part being secured to one of the tubes, supporting means for the other part, guide means for directing the transverse movement of the telescoping tubes, a second fluid-conducting universal joint having two parts, one of which is connected with another tube, a coupling head connected with the other part of the second mentioned fluid-conducting universal joint, resilient means for holding the coupling head yieldingly relatively to the second mentioned fluid-conducting universal joint, and resilient means for holding the second mentioned fluid-conducting universal joint extended from the first mentioned fluid-conducting universal joint.

DEAN H. THOMPSON.